United States Patent
Mitchell, Jr. et al.

[11] Patent Number: 6,136,468
[45] Date of Patent: Oct. 24, 2000

[54] ELECTROCHEMICAL CELL WITH DEFERRED ASSEMBLY

[75] Inventors: Chauncey T. Mitchell, Jr., Lakeland, Tenn.; David M. Good, Peachtree City, Ga.; Robert Parker, Bend, Oreg.; Mark A. Shadle, Peachtree City, Ga.; Gerrit L. Verschuur, Lakeland, Tenn.

[73] Assignee: Timer Technologies, LLC, Algoma, Wis.

[21] Appl. No.: 09/139,495

[22] Filed: Aug. 25, 1998

[51] Int. Cl.[7] .................................................. H01M 6/30
[52] U.S. Cl. .......................... 429/110; 429/113; 429/116; 429/117; 429/126
[58] Field of Search .................................... 429/110, 113, 429/124, 116, 117, 126

[56] References Cited

U.S. PATENT DOCUMENTS

| | | |
|---|---|---|
| 2,688,649 | 9/1954 | Bjorksten . |
| 3,006,980 | 10/1961 | Story . |
| 3,209,255 | 9/1965 | Estes et al. . |
| 3,230,115 | 1/1966 | Tamminen . |
| 3,607,430 | 9/1971 | Glover . |
| 4,049,888 | 9/1977 | Flender ................................... 429/115 |
| 4,153,345 | 5/1979 | Duchene et al. . |
| 4,161,815 | 7/1979 | Land et al. . |
| 4,539,275 | 9/1985 | Plasse . |
| 4,614,695 | 9/1986 | Ibbott . |
| 4,664,993 | 5/1987 | Sturgis et al. . |
| 4,804,275 | 2/1989 | Kang et al. . |
| 5,035,965 | 7/1991 | Sangyoki et al. . |
| 5,055,968 | 10/1991 | Nishi et al. . |
| 5,068,162 | 11/1991 | Kulkarni ................................. 429/116 |
| 5,147,985 | 9/1992 | DuBrucq . |
| 5,225,291 | 7/1993 | Rao . |
| 5,250,905 | 10/1993 | Kuo et al. . |
| 5,339,024 | 8/1994 | Kuo et al. . |
| 5,350,645 | 9/1994 | Lake et al. . |
| 5,396,177 | 3/1995 | Kuo et al. . |
| 5,418,086 | 5/1995 | Bailey . |
| 5,487,955 | 1/1996 | Korall et al. ............................... 429/26 |
| 5,495,250 | 2/1996 | Ghaem et al. . |
| 5,542,959 | 8/1996 | Tuttle . |
| 5,563,002 | 10/1996 | Harshe . |
| 5,627,472 | 5/1997 | Ofer et al. . |
| 5,635,312 | 6/1997 | Yanagisawa et al. . |
| 5,637,418 | 6/1997 | Brown et al. . |
| 5,652,043 | 7/1997 | Nitzan . |
| 5,656,393 | 8/1997 | Boer et al. . |
| 5,763,058 | 6/1998 | Isen et al. . |

*Primary Examiner*—Maria Nuzzolillo
*Assistant Examiner*—Raymond Alejandro
*Attorney, Agent, or Firm*—Eugene Stephens & Associates

[57] ABSTRACT

Printed electrochemical cells including both power cells and display cells are arranged in a partially assembled condition to extend shelf life of the cells. The partially assembled condition is also used as a switching mechanism for controlling activation of some of the cells. The active components of the cells include two electrodes and an electrolyte layer that is maintained out of contact with at least one of the electrodes for interrupting an ionically conductive pathway between the electrodes. The electrolyte is preferably an electrolytic adhesive that is protected by a release layer until the cells are needed for service.

15 Claims, 9 Drawing Sheets

ELECTROCHEMICAL CELL WITH DEFERRED ASSEMBLY

TECHNICAL FIELD

Electrochemical cells of the type formed in layers, including some layers laid down by printing, are adapted for such purposes as single-use power sources and self-powered displays. Electrode layers are logically separated prior to use for extending shelf life and for providing an alternative mechanism for activating the cells.

BACKGROUND

Self-discharge is a problem of electrochemical cells, particularly for less expensive cells made by printing at least some of the active layers. The unwanted electrochemical activity occurs through an electrolyte layer connecting two electrode layers (i.e., an anode layer and a cathode layer). The electrolyte layer provides a pathway for ionic conduction between the electrodes. However, some electrical conductivity can also occur within the electrolyte layer, which short circuits the cells and supports the unwanted discharge.

Chemical and physical interactions of the electrolyte layer with its surroundings can also degrade electrochemical cell performance. For example, materials within the electrolyte layer can interact with one or more of the electrode layers to chemically alter the electrode layers. Evaporation of liquids from the electrolyte layer can significantly degrade the ionic conductivity of the electrolyte layer.

Coin cells are popular as low-power sources for voice-chips, such as those used in greeting cards, as well as for electrochromic or liquid crystal displays. However, such coin cells are quite bulky for use with printed products and require physical connections that add to their bulk and diminish their reliability. Even though the coin cells are sealed to protect their active layers, self-discharge is still a problem, especially when the cells are stored in hot humid conditions.

U.S. Pat. No. 3,230,115 to Tamminen discloses an early example of a printed battery. Printed side-by-side on a plastic sheet are pairs of electrodes overlapped by an electrolyte layer made of a viscous adhesive gel. Conductive inks are printed in contact with outer edges of the electrodes for connecting like electrodes to each other (for forming a multi-cell battery) or to an electrical load. A plastic adhesive paint is sprayed over the electrolyte layer to prevent evaporation of moisture while venting gas byproducts.

A battery laminate disclosed in U.S. Pat. No. 5,350,645 to Lake et al. features electrolyte and electrode layers printed on or otherwise applied to sheets that are stacked together to form batteries. U.S. Pat. No. 5,652,043 to Nitzan treats the problem of liquid evaporation from the electrolyte layer of a similar stacked electrochemical cell laminate by adding a deliquescent material to the electrolyte layer.

Although various steps are taken by Tamminen, Lake et al., and Nitzan to prevent deterioration of electrolyte, their printed electrochemical cells are still subject to discharge through electrolyte layers connecting electrodes. Since the capacities of printed electrochemical cells are generally limited, such self-discharging can significantly limit their shelf life.

Regardless of cell shape, confining liquid electrolyte has long been a problem. U.S. Pat. No. 5,225,291 to Rao solves this problem in marine batteries by using surrounding sea water as an electrolyte. Electrode plates are mounted on opposite sides of a dielectric plate. Activation of the cell is deferred until the plate assembly is immersed in sea water.

SUMMARY OF INVENTION

Our invention is primarily directed to extending the shelf life of printed electrochemical cells but is also useful as a switching mechanism for activating the electrochemical cells. An electrolyte layer of the printed electrochemical cells is maintained out of ionic communication with at least one of two electrode layers until the electrochemical cells are placed in service. Various types of electrochemical cells can benefit from this invention including power cells and display cells.

One example of a printed electrochemical cell arranged for deferred assembly includes the usual combination of first and second electrode layers and an electrolyte layer. An electronically conductive pathway is arranged to support a flow of current between the electrode layers. However, in contrast to a fully assembled electrochemical cell, the electrolyte layer is positioned out of contact with at least one of the electrode layers for interrupting an ionically conductive pathway between the first and second electrode layers. A protective layer temporarily covers the electrolyte layer prior to completion of the cell assembly. The interruption of the ionically conductive pathway greatly reduces possibilities for self-discharge of the cell. However, when ready for service, the electrolyte layer can be separated from the protective layer and positioned in operative contact with both electrode layers to close the ionically conductive pathway.

The two electrode layers, the electrolyte layer, and the protective layer can be supported in various combinations on the same or different substrate portions (which include different substrates or different parts of the same substrate). For example, the two electrode layers can be stacked or laid out side-by-side on a first substrate portion, the electrolyte layer can be laid out on a second substrate portion, and the protective layer can be laid out on a third substrate portion. For purposes of storage prior to completion of the cell assembly, the second and third substrate portions are laminated together—the electrolyte layer in contact with the protective layer. For completing cell assembly and placing the cell in service, the second and third substrate portions are separated and the first and second substrate portions are then laminated together—the electrolyte layer in contact with the first and second electrode layers.

The two electrode layers can also be laid out on different substrate portions. For example, one of the electrodes can be laid down on a first substrate portion, and the other electrode can be laid down together with the electrolyte layer on a second substrate portion. A protective layer of a third substrate portion is initially laminated to the second substrate portion for covering an otherwise exposed surface of the electrolyte layer. Upon separation from the third substrate portion, the second substrate portion can be laminated to the first substrate portion to complete the cell.

The different portions of a single substrate can be variously laminated together by separating, folding, or winding the substrate. For example, both electrodes, the electrolyte layer, and the protective layer can be arranged on a single substrate that is separated into parts and stacked together, folded, wound, or otherwise manipulated so that the electrolyte layer is alternately positioned in contact with the protective layer or the two electrodes.

Preferably, the electrolyte of the electrolyte layer is formed by a pressure-sensitive electrolytic adhesive, and the protective layer is formed by a release liner. After removal from the release liner, the electrolytic adhesive can be used to bond the two electrodes and their supporting substrate portions together in positions that complete the ionically conductive pathway between the electrodes.

Another example of an electrochemical cell arranged for deferred assembly includes an electrolyte layer that is mounted on a different substrate portion than at least one of two electrode layers but is stacked together with the two electrode layers between the different substrate portions. For instance, a first electrode layer can be mounted on a first substrate portion, a second electrode layer together with an electrolyte layer can be mounted on a second substrate portion, and the two substrate portions can be laminated together. An electronically conductive pathway interconnects the first and second electrode layers. However, a separator mounted between the electrolyte layer and the first electrode layer interrupts an ionically conductive pathway between the first and second electrode layers.

The separator can be formed by a removable substrate, a substrate with an opening through which the ionically conductive pathway can be completed, or a passivating covering for the electrolyte. The removable substrate, which can include a release layer (especially if the electrolyte layer is formed by a pressure-sensitive adhesive), isolates the electrolyte layer from the first electrode layer but can be removed from the stack to permit the electrolyte layer to contact the first electrode layer.

The substrate with an opening functions as a spacer. The substrate portions supporting the electrolyte layer and the first electrode layer are spaced apart on opposite sides of the spacer opening. However, the substrate portions, which are also resilient, can be pressed together to move the electrolyte layer into operative contact with the first electrode layer within the spacer opening. The electrolyte is preferably a pressure-sensitive electrolytic adhesive for bonding with the first electrode layer, and the first electrode layer is preferably flexibly mounted from its underlying substrate portion so that the first electrode layer remains bonded to the electrolyte layer even after the supporting substrate portions return to their original positions.

The passivating covering preferably includes an ionically inactive coating for encapsulating (e.g., microencapsulating) the electrolyte. A mechanical action such as rubbing, scratching, or squeezing the substrate portions can transfer sufficient force to release the electrolyte from its encapsulation and complete the ionically conductive pathway between electrodes.

One more example of an electrochemical cell arranged for deferred assembly includes first and second electrode layers and an electrolyte layer that is mounted out of ionic communication with the first electrode layer. The electrolyte layer is transformable from a material that exhibits a lower adhesion to the first electrode layer to a material that exhibits a higher adhesion to the first electrode layer. Upon the transformation, the electrolyte layer is mountable in ionic communication with the first electrode layer for completing the ionically conductive pathway between the first and second electrode layers.

Initially, the electrolyte layer is preferably mounted out of contact with the first electrode layer for interrupting the ionically conductive pathway between the first and second electrode layers. However, after activation such as by wetting, the electrolyte layer is preferably movable into operative contact with the first electrode layer for completing the ionically conductive pathway between the first and second electrode layers. The contact can also provide a bond between the first and second electrode layers.

Our invention can also be arranged as a succession of deferred assembly electrochemical cells. The first and second electrode layers are printed in repeating patterns along one or more webs, and an electrolyte layer is printed out of contact with at least one of the first and second electrode layers for interrupting a succession of ionically conductive pathways between the repeating patterns of the first and second electrodes. However, the electrolyte layer is movable together with underlying portions of the one or more webs for completing the ionically conductive pathways between the repeating patterns of the first and second electrode layers.

The electrolyte layer is preferably made of an electrolytic adhesive and is protected by a release layer. Portions of the electrolyte layer are releasable from the release layer and movable into operative contact with the repeating patterns of the electrode layer for subsequently completing the ionically conductive pathways between the repeating patterns of the first and second electrode layers. Conductors extending from the succession of cells can be connected to the same or different loads (e.g., in series or in parallel).

A succession of the printed electrochemical cells can also be arranged in an array of separately actuatable power sources connected to a common load circuit. The electrochemical cells have electronically conductive pathways extending from pairs of electrodes and arranged in parallel with the common load circuit. At least one member of each of the pairs of electrodes is mounted out of contact with an electrolyte. However, the electrolyte can be moved into operative contact with the electrodes of each pair for individually activating the electrochemical cells. Thus, the array provides a succession of power sources that can be activated in sequence for maintaining or restoring power to a common load circuit.

In addition to providing a source of power, the electrochemical cells of our invention can also be arranged as display cells with deferred activation. The display cells include first and second electrode layers and an electrolyte layer positioned out of contact with at least the first electrode layer for interrupting an ionically conductive pathway between the first and second electrode layers. The electrolyte layer, which can be supported by a separate substrate portion from the first electrode layer, is movable together with the separate substrate portion into operative contact with the first electrode layer for initiating an electrochemical reaction that erodes the first electrode layer and displays visual information.

Our invention can also be practiced as method of constructing a succession of electrochemical cells arranged for deferred assembly along an in-line press. The method involves advancing first and second electrode layers along the press with at least one of the first and second electrode layers being printed in a repeating pattern. An electrolyte layer is applied out of contact with at least the first electrode layer for interrupting an ionically conductive pathway between the first and second electrode layers. A finishing step arranges the electrode and electrolyte layers into one or more formats while maintaining the electrolyte layer out of contact with at least the first electrode layer.

The electrolyte layer is preferably made of an electrolytic adhesive, and a release layer is preferably mounted over the electrolyte layer in advance of the finishing step. The finishing step can include winding the first and second electrode layers and the electrolyte layer into one or more rolls, fan folding the same layers into one or more stacks, or die cutting to separate the succession of electrochemical cells formed by the layers.

DETAILED DESCRIPTION

Figure 1:
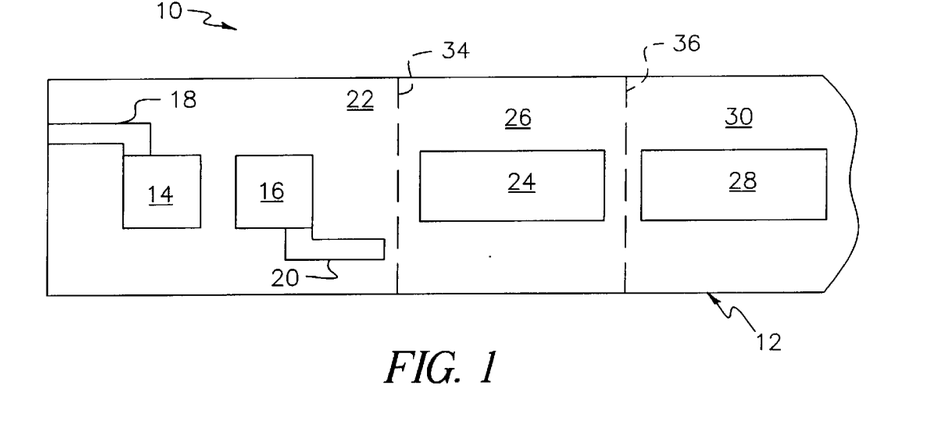
FIG. 1 is a plan view of an electrochemical cell laid out in patterns along a continuous web substrate.
Figure 2:
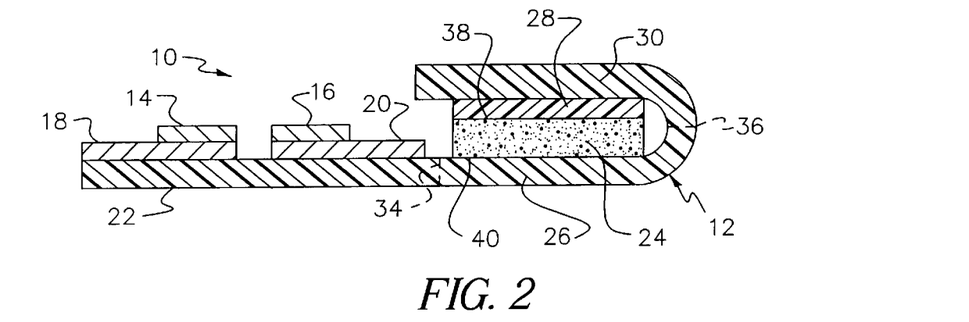
FIG. 2 is a side cross-sectional view of the cell shown in FIG. 1 arranged in a partially assembled form for safe storage.
Figure 3:
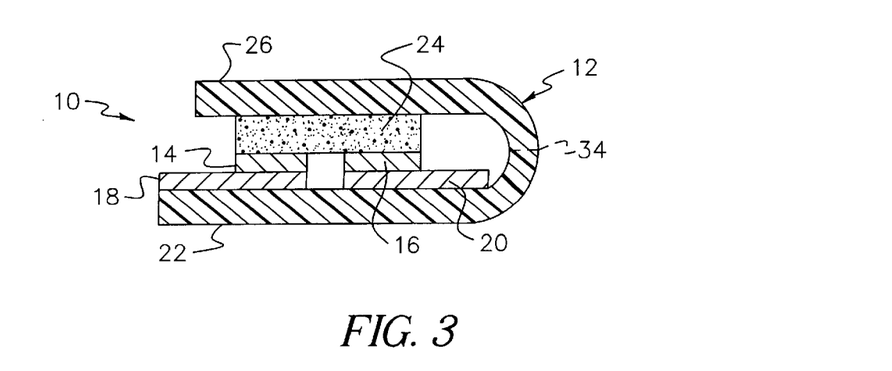
FIG. 3 is a similar cross-sectional view of the cell shown in FIGS. 1 and 2 in a completely assembled form ready for service.

The first three drawing figures show a printed electrochemical cell 10 printed on a common substrate or web 12 and arranged in various stages of assembly. FIG. 1 shows the active components of the cell 10 including two electrodes 14 and 16 and two underlying conductors 18 and 20 laid out side-by-side on a first portion 22 of the substrate 12 and an electrolyte layer 24 supported on at second portion 26 of the substrate 12. A release layer 28 is supported on a third portion 30 of the substrate 12. Although truncated in the drawing figure, the substrate 12 can be extended in the form of a continuous web to support a succession of the same components.

The two conductors 18 and 20 form portions of an electronically conductive pathway between the electrodes 14 and 16. A load, which can be driven by the electrochemical cell 10; a power source, which can itself drive the electrochemical cell 10; or a switch arm completes the electronically conductive pathway. The electrolyte layer 24 as shown in FIGS. 1 and 2 is positioned out of contact with the two electrodes 14 and 16 for interrupting an ionically conductive pathway between the electrodes 14 and 16.

The two electrodes 14 and 16 preferably have different electrode potentials for generating electrical power. For example, the electrode 14 can be printed with an ink containing a dispersion of zinc (Zn), and the electrode 16 can be printed with an ink dispersed with manganese dioxide ($MnO_2$). The two conductors 18 and 20 can be printed with a carbon/silver ink. The electrolyte of the electrolyte layer 24 is preferably an electrolytic adhesive, which can be made by mixing an electrolytic salt into an adhesive, such as a pressure-sensitive or UV-curable adhesive or an animal glue. The release layer 28, which is preferably made of silicone, is matched with the adhesive properties of the electrolyte layer 24 to support safe engagements and disengagements with the electrolyte layer 24. The substrate 12, which can also be made from a variety of materials, is preferably made of a polyester or PET (polyethylene terephtalate) film to support the desired printed layers and to protect them from environmental degradation.

Lines 34 and 36 divide the substrate 12 into the substrate portions 22, 26, and 30. The line 34 is preferably a fold line, and the line 36 is preferably both a fold and a tear line. Fold lines can be impressed in the substrate 12 to direct or assist the bending of the substrate 12. Tear lines can be formed by perforating or scribing the substrate 12. Any one or more of the substrate portions 22, 26, or 30 can be separated from each other by die cutting or similar severing operations.

In FIG. 2, the substrate portion 30 is folded or detached about the line 36, moving the release layer 28 into a position covering a top surface 38 of the electrolyte layer 24. A bottom surface 40 of the electrolyte layer 24 is already covered by the substrate portion 26, so both the top and bottom surfaces 38 and 40 of the electrolyte layer are protected by the substrate 12.

The electrochemical cell 10 can be stored for an extended period of time in the state of partial assembly illustrated by FIG. 2. Maintaining the electrolyte layer 24 out of contact with the electrodes 14 and 16 prevents self-discharge of the cell 10 through the electrolyte layer 24. The enclosure formed by the substrate portions 26 and 30 protects the electrolyte layer 24 until the cell is needed for service, and the release layer 28 permits separation of the substrate portion 30 to expose the electrolyte layer 24 in preparation for completing the cell assembly and entering the cell into service.

FIG. 3 shows the completed cell assembly. The substrate portion 30 together with the release layer 28 is detached and discarded. The substrate portion 26 is folded about the line 34, moving the electrolyte layer 24 into operative contact with both electrodes 14 and 16. Alternatively, the substrate portion 26 could be detached and moved into a similar position. The repositioned electrolyte layer 24 completes an ionically conductive pathway between the electrodes 14 and 16 and renders the cell capable of use, subject to the completion of the electronically conductive pathway between the electrodes 14 and 16.

Figure 4:
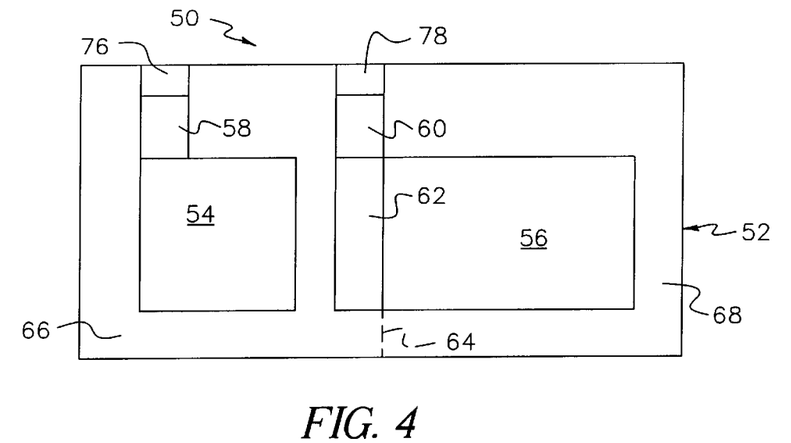
FIG. 4 is a top view showing some of the active components of another electrochemical cell laid out in patterns along a continuous web substrate.
Figure 5:
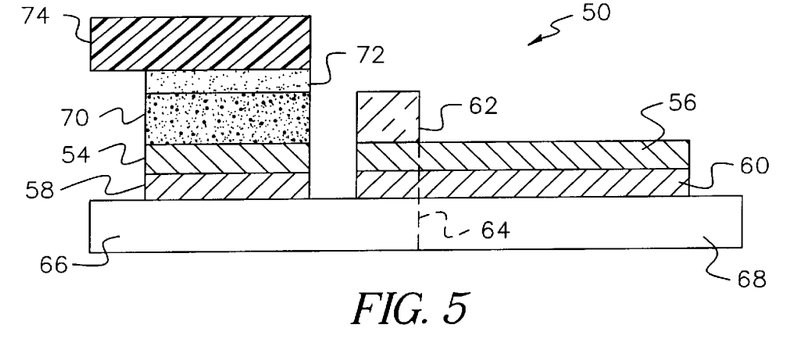
FIG. 5 is a side cross-sectional view of the cell shown in FIG. 4 arranged with additional layers in a partially assembled form for safe storage.
Figure 6:
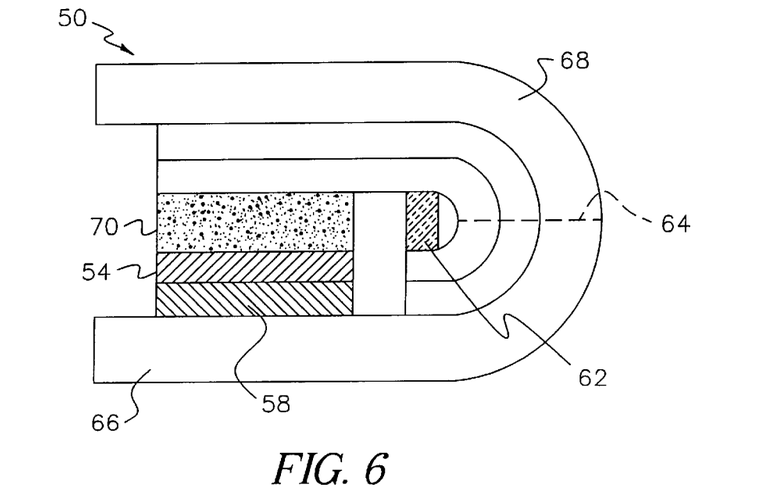
FIG. 6 is a similar cross-sectional view of the cell shown in FIGS. 4 and 5 in a completely assembled form ready for service.

The next series of three drawing figures, FIGS. 4–6, depict another electrochemical display cell 50 in progressive stages of assembly. FIG. 4 depicts a limited number of the cell layers as they would be applied during manufacture. Two electrodes 54 and 56, two underlying conductors 58 and 60, and a dielectric layer 62 covering a portion of the electrode 56 are applied to common substrate 52. A fold line 64, which extends along an edge of the dielectric layer 62 divides the substrate 52 into two portions 66 and 68.

The remaining layers of the cell 50, which are arranged in a manner intended to extend shelf life, are shown in FIG. 5. A electrolyte layer 70, which is preferably an electrolytic adhesive, is mounted in contact with the electrode 54 but not in contact with the electrode 56. A release layer 72 carried on another substrate 74 protects the electrolyte layer 70 until the cell 50 is needed for service. Alternatively, the release layer 72 could be carried on an adjacent portion of the substrate 52 (similar to the preceding embodiment) and folded into contact with the electrolyte layer 72.

Cell assembly is completed as shown in FIG. 6 by removing the substrate 74 together with the release layer 72 and by folding the substrate portion 68 about the fold line 64 to position the electrode 56 in contact with the electrolyte layer 70. Positioning both electrodes 54 and 56 in contact with the electrolyte layer 70 completes an ionically conductive pathway between the electrodes 54 and 56. All that remains to activate the cell 50 is completion of the separate electronically conductive pathway between electrodes, which can be accomplished by connecting a load across the conductors 58 and 60. To assist such connections, conductive adhesive patterns 76 and 78 (shown in FIG. 4) are applied to ends of the conductors 58 and 60. The location of the fold line 64 along with the addition of the dielectric layer 62 permits the two conductors 56 and 58 to remain in a common orientation, which can also facilitate completion of the load circuit.

Figure 7:
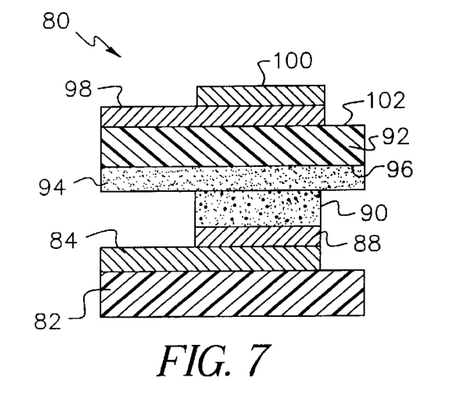
FIG. 7 is a cross-sectional side view of another electrochemical cell having various layers arranged in a partially assembled form for safe storage.
Figure 8:
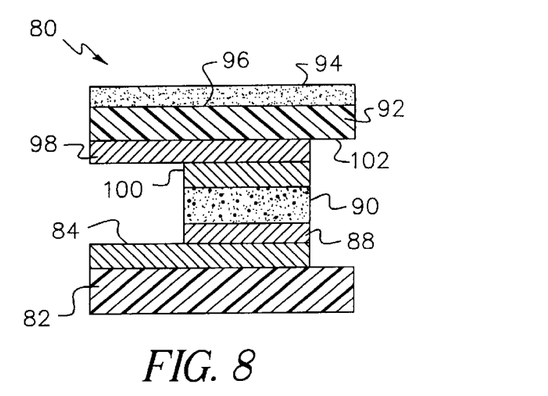
FIG. 8 is a similar cross-sectional view of the cell shown in FIG. 7 in a completely assembled form ready for service.

FIGS. 7 and 8 show two stack configurations of an electrochemical cell 80. The configuration of FIG. 7 is a state of partial disassembly advantageous for storing the cell 80. The configuration of FIG. 8 completes the assembly, readying the cell 80 for use.

A first substrate 82 supports in layers a conductor 84, an electrode 88, and an electrolyte 90. A second substrate 92 supports a release layer 94 from one surface 96 and a conductor 98 together with an electrode 100 from an opposite surface 102. In the disassembled state, the release layer 94 of the second substrate 92 contacts the electrolyte layer 90 of the substrate 82, interrupting an ionically conductive pathway between the electrodes 88 and 100. In the assembled state, the second substrate 92 is inverted with respect to the first substrate 82 to bring the electrode layer 100 into operative contact with the electrolyte layer 90, completing the ionically conductive pathway between the electrodes 88 and 100. An electronic connection between the conductors 84 and 98 activates the cell 80.

Figure 9:
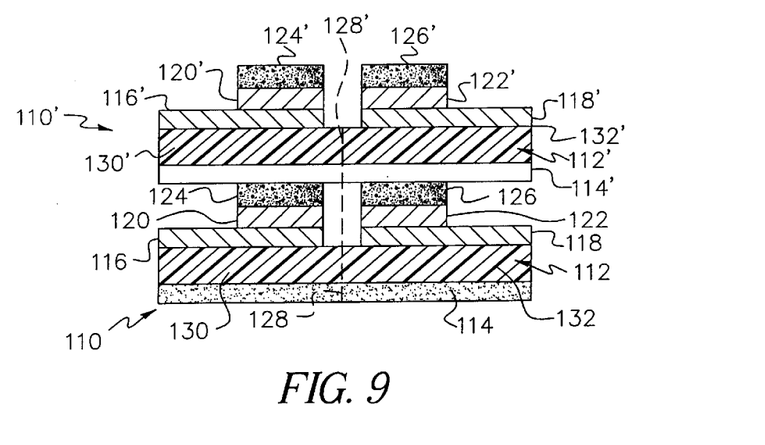
FIG. 9 is a cross-sectional side view of a stack of electrochemical cells having adjacent cell layers arranged for protecting the cells in a partially assembled form.

A plurality of electrochemical cells 110 and 110' are stacked together in a repeating pattern in FIG. 9. Each of the identical cells 110 and 110' has a single substrate 112 or 112' supporting a release layer 114 or 114' on one side and a pair of conductors 116, 116' and 118, 118' on the other side. Layered on the conductors are pairs of electrodes 120, 120' and 122, 122' and electrolyte portions 124, 124' and 126, 126'. Fold lines 128 and 128' divide the cells 110 and 110' into two relatively movable parts 130, 130' and 132, 132'.

The release layer 114' of the overlying cell 110' covers the electrolyte portions 124 and 126 of the underlying cell 110. Although electrolyte portions 124, 124' and 126, 126' individually contact both electrodes 120, 120' and 122, 122' of each of the cells 110, 110', the ionically conductive pathways between the electrodes 120, 120' and 122, 122' are interrupted because the electrolyte portions 124, 124' and 126, 126' of each cell 110 and 110' are separated from one another. The same dual arrangement of electrolyte portions can be used in any of the other embodiments, each electrolyte portion being positioned out of contact with one of the two cell electrodes. Instead of arranging the cells 110 and 110' in a stack configuration prior to use, the cells 110 and 110' could be formed along a common substrate having a similar release backing and wound together into a coil that would similarly protect the electrolyte portions until the cells are needed for service.

Figure 10:
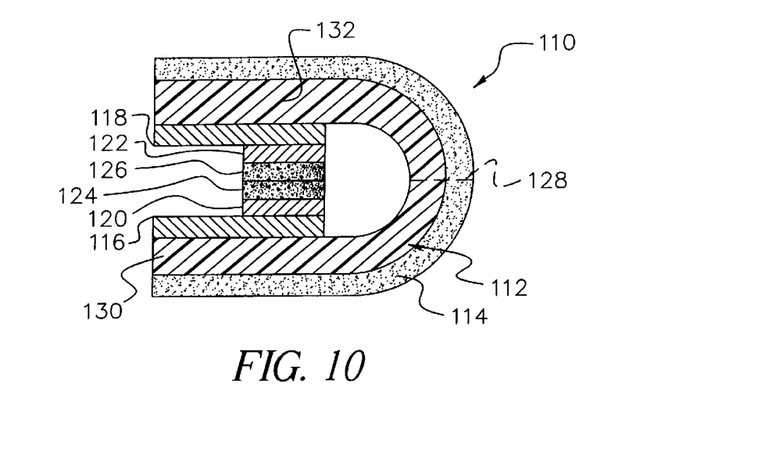
FIG. 10 is a similar cross-sectional view showing one of the cells shown in FIG. 9 in a completely assembled form ready for service.
Figure 11:
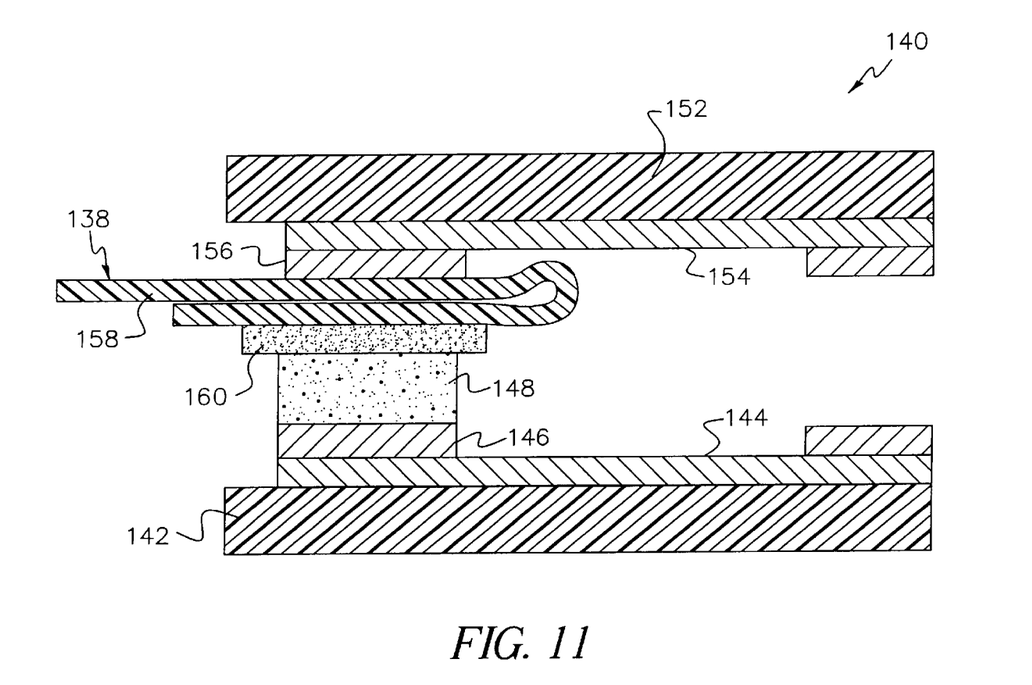
FIG. 11 is a cross-sectional side view of another electrochemical cell having a removable separator for maintaining the cell in a partially assembled form.

FIG. 10 shows the completed assembly of the cell 110, which has been removed from the stack of cells 110 and 110' shown in FIG. 11. The cell portion 132 is bent around the fold line 128, bringing the two electrolyte portions 124 and 126 into direct contact with each other and into operative contact with their opposing electrodes 120 and 122 for completing the electronically conductive pathway between the electrodes 120 and 122. Of course, a single electrolyte layer (e.g., 124) could be provided for each cell 110, which is moveable into direct contact with both electrodes 120 and 122 to complete the cell assembly.

Figure 12:
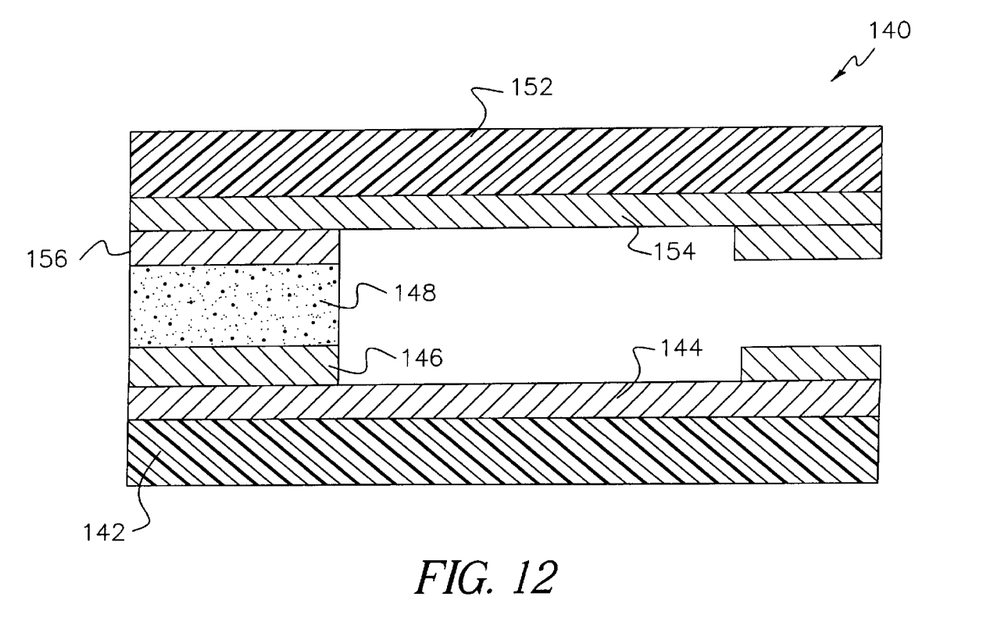
FIG. 12 is a similar cross-sectional view of the cell shown in FIG. 11 in a completely assembled form ready for service.

The order of the active cell layers can be maintained between disassembled and assembled states as illustrated by FIGS. 11 and 12 by the use of a removable separator 138 between two of the active layers of a printed electrochemical cell 140. Layered on a first substrate 142 are a conductor 144, an electrode 146, and an electrolyte pattern 148. Layered on a second substrate 152 are a conductor 154 and an electrode 156. The removable separator 138 includes a third substrate 158, which is folded for easier removal. When in place, the removable separator 138 separates the electrolyte pattern 148 on the first substrate 142 from the electrode layer 156 on the second substrate 152. The electrolyte pattern 148 is preferably formed by an electrolytic adhesive, and a release layer 160 is preferably applied to the third substrate 158 to facilitate separation of the third substrate 158' from the electrolyte pattern 148. A dielectric adhesive, not shown, can be used to otherwise bond the first and second substrates 142 and 152 together in this or any of the other embodiments having overlapping substrates or substrate portions.

During periods of storage, the removable separator 138 prevents ionic conduction between the two electrodes 146 and 156. However, when the cell 140 is needed for service, the removable separator 138 can be removed, and the electrode 156 on the substrate 152 can be moved into operative contact with the electrolyte pattern 148 on the substrate 142 to complete an ionically conductive pathway between the electrodes 146 and 156. Conductive adhesive patterns 162 and 164 on the conductors 144 and 154 can be used to help close an electronically conductive pathway between the electrodes 146 and 156 to activate the cell 140.

Figure 13:
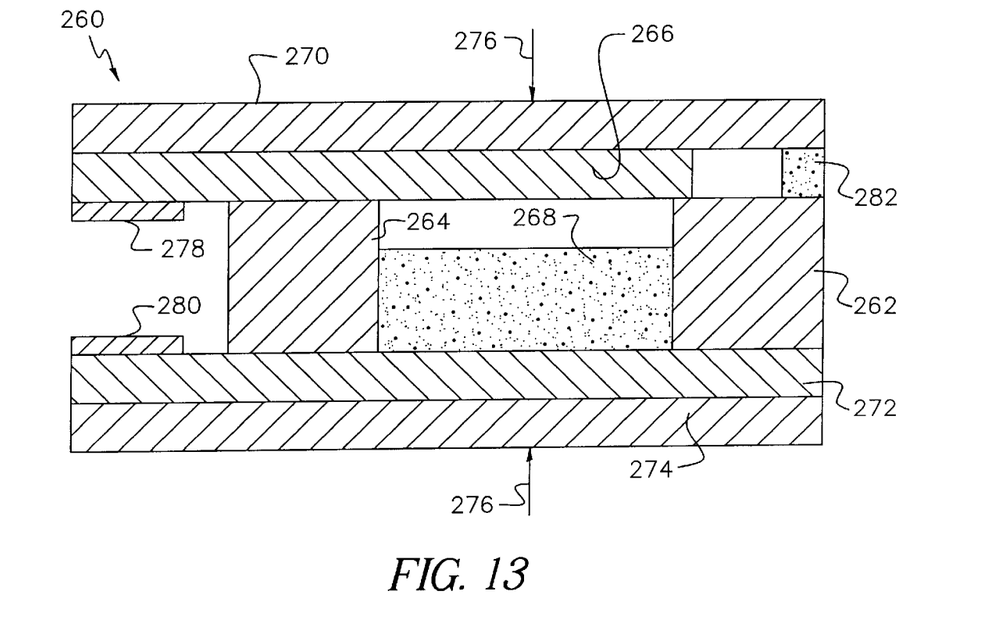
FIG. 13 is a cross-sectional side view of an electrochemical cell with a spacer for maintaining the cell in a deferred assembly state.
Figure 14:
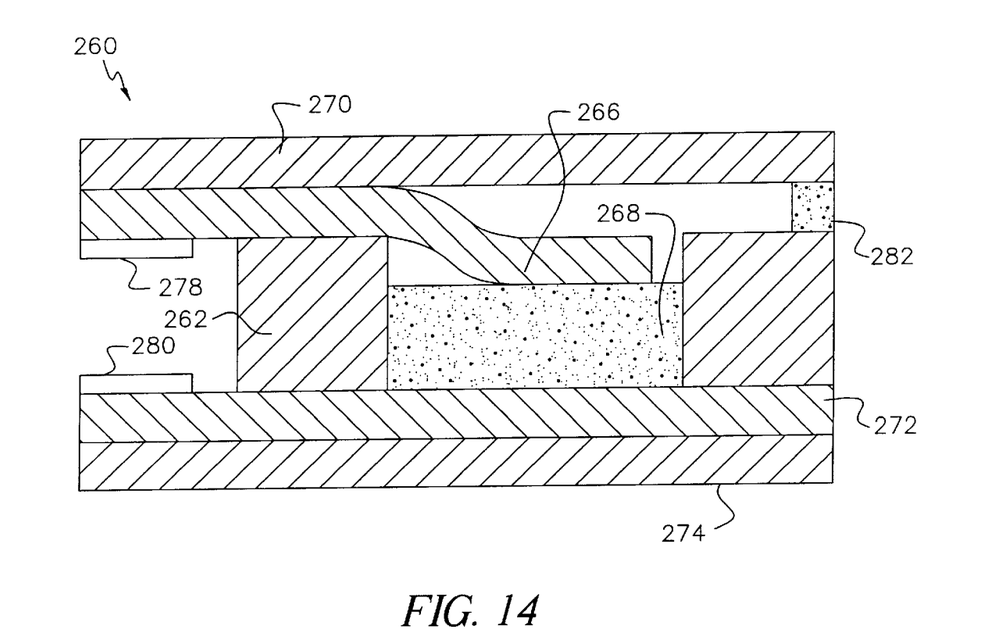
FIG. 14 is a similar cross-sectional view of the cell shown in FIG. 13 in a completely assembled form ready for service.

An electrochemical cell 260 illustrated in FIGS. 13 and 14 has a separator that takes the form of a spacer 262 having an opening 264 through which a first electrode 266 and an electrolyte layer 268 are aligned. The electrode 266, which is preferably a metal deposited film or foil, is flexibly mounted from a first substrate portion 270; and the electrolyte layer 268, which is preferably a pressure-sensitive electrolytic adhesive, is mounted together with a second electrode 272 on a second substrate portion 274. The two substrate portions 270 and 274 are relatively resilient for biasing the first electrode 266 apart from the electrolyte layer 268 across the spacer opening 264. Polyester or PET films can be used for this purpose. A dielectric adhesive 282 separately bonds the substrate portions 270 and 274 together.

The two relatively resilient substrate portions 270 and 274 can be pressed together in the direction of the arrows 276 to move the first electrode 266 and the electrolyte layer 268 into operative contact within the spacer window 264. The first electrode 266 moves together with the first substrate 270 into contact with the electrolyte layer 268 as shown in FIG. 14, but does not move out of contact with the electrolyte layer 268 when the first substrate 270 returns to its original position. Instead, a portion of the flexibly mounted first electrode 266 detaches from the first substrate 270 and remains permanently bonded to the electrolyte layer 268, completing the ionically conductive pathway between the electrodes 266 and 272.

The two electrodes 266 and 272, which themselves function as conductors, have contacts 278 and 280 for connecting the cell 260 to a load circuit (not shown). Of course, like earlier embodiments, conductor/collector layers can be used in conjunction with the electrode layers to supplement the conductivity of the electrode layers. The electrode layers or the conductive layers could also be embedded in or be characteristic of their supporting substrates, such as is the case with metal foils. Also, completion of the cell 260 by permanently joining the electrolyte layer 268 with the first electrode 266 can be used as a switching function for activating the cell 260.

Figure 15:
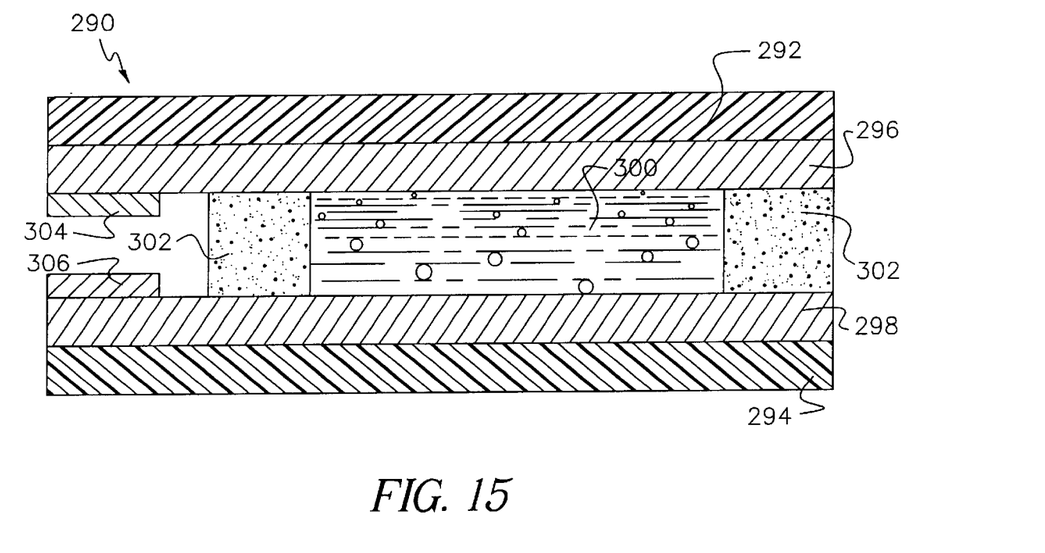
FIG. 15 is a cross-sectional side view of an electrochemical cell with a passivating covering for maintaining the cell in a deferred assembly state.

Another type of separator that can maintain the order of the active layers in both disassembled and assembled states is depicted with an electrochemical cell 290 shown in FIG. 15. Between two substrate portions 292 and 294 are stacked two electrode layers 296 and 298 and a layer of microencapsulated electrolyte 300. A layer of dielectric adhesive 302 confines the microencapsulated electrolyte 300 and bonds the two substrate portions 292 and 294 together. Similar to the preceding embodiment, extended portions of the two electrode layers 296 and 298 include contacts 304 and 306 for connecting the cell 290 to a load circuit.

The cell 290 can be completed by such mechanical actions as rubbing, scratching, squeezing, or folding the substrate portions 292 and 294 for releasing the electrolyte from microencapsulation and completing an ionically conductive pathway between the electrode layers 296 and 298. Upon previous completion of the electronically conductive pathway between the electrode layers 296 and 298, the release of electrolyte from encapsulation can also be used as a switch for activating the cell 290. A rupturable passivation layer (not shown) could be used in place of microencapsulation to maintain the electrolyte out of contact with one of the electrode layers 296 and 298 until an appropriate mechanical action is applied to the cell 290.

Other types of electrolytes that do not require a separator or a protective covering prior to final assembly can also be used in accordance with our invention. For example, FIG. 16 discloses a printed electrochemical cell 170 in a deferred assembly condition without a release layer or any type of separator protecting an electrolyte layer 172. A first substrate portion 174 supports a conductor layer 176 and an electrode layer 178. A second substrate portion 180, which is separated from the first substrate portion 174 by a fold line 182, supports a conductor layer 184 and an electrode layer 186 together with the electrolyte layer 172.

Figure 16:
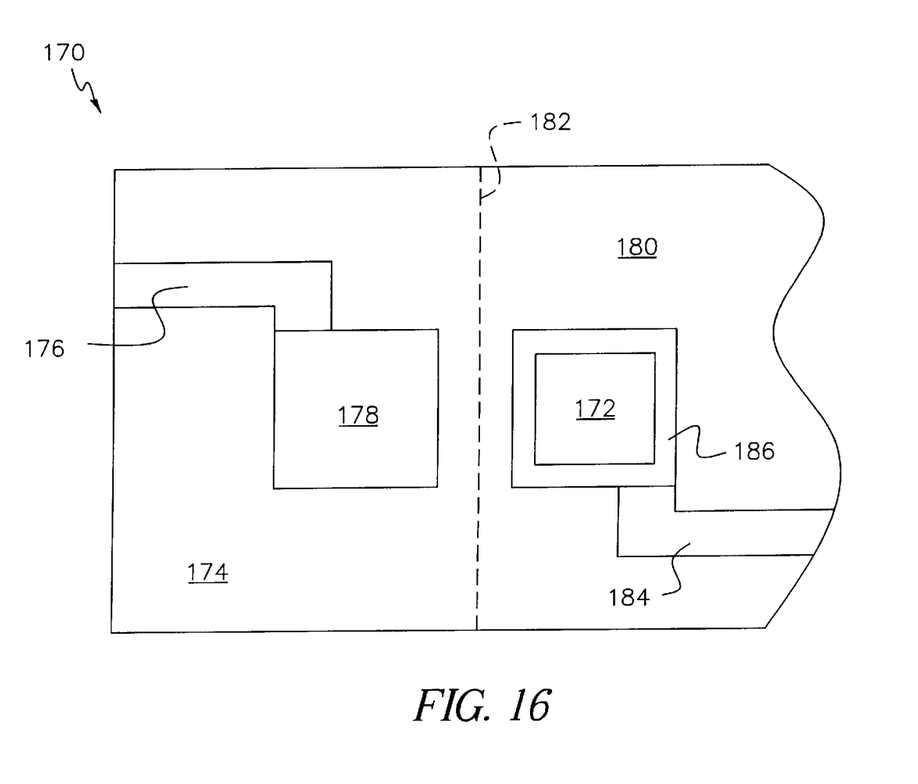
FIG. 16 is a plan view of another electrochemical cell laid out in patterns along a substrate in a partially assembled form that is readily completable by steps involving the transformation of an electrolyte layer.

In contrast to the preceding embodiments, the electrolyte preferred for the electrolyte layer 172 is transformable from a material that exhibits lower adhesion to a material that exhibits higher adhesion to the exposed electrode layer 178. For example, the electrolyte layer 172 can be composed of a dry-gum adhesive that is activated by the addition of water. Prior to transformation, the electrolyte layer 172 is preferably not sticky and resistant to wear.

Cell assembly is completed by transforming the electrolyte, such as by addition of water, and folding the substrate portion 180 about the fold line 182 to move the transformed electrolyte layer 172 into contact with the electrode layer 178. The transformed electrolyte layer 172 bonds the two electrode layers 178 and 186 together and completes an ionically conductive pathway between the electrode layers 178 and 186. Completion of an electronic circuit between the conductor layers 176 and 184 activates the cell 170.

Figure 17:
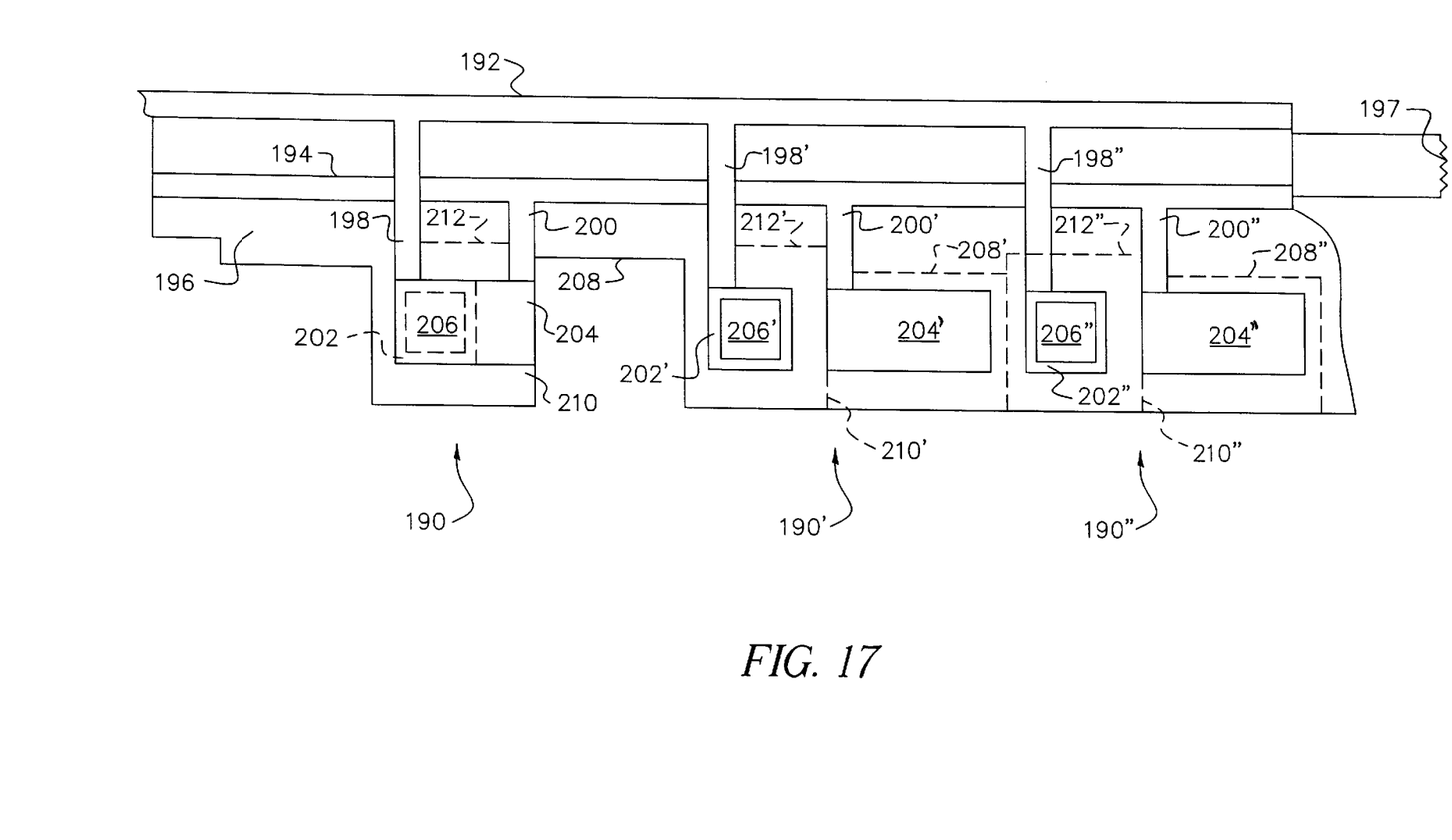
FIG. 17 is a plan view of an array of electrochemical cells connected to a common electrical bus and arranged to be individually activated by completing assembly of the cells.

In addition to extending shelf life, the interruption of ionically conductive pathways between electrodes can also be used to control activation of our printed electrochemical cells. FIG. 17 depicts an array of printed electrochemical cells 190, 190', 190" connected to common electronic bus lines 192 and 194, which deliver electrical power generated by the electrochemical cells 190, 190', 190" to a common load circuit 197.

The cells 190, 190', 190" are mounted on a common substrate 196. Each includes two conductors 198, 198', 198" and 200, 200', 200"; two electrodes 202, 202', 202" and 204, 204', 204"; and an electrolyte pattern 206, 206', 206". A release layer or other cover (not shown) can be used to protect the electrolyte patterns 206, 206', 206" until the cells are needed for use. Perforations 208, 208', 208" permit substrate portions supporting the electrodes 204, 204', 204" to be separated from the remaining substrate 196 and folded about fold lines 210, 210', 210" for moving the electrodes 204, 204', 204" into operative contact with the electrolyte patterns 206, 206', 206". One or more of the cells 190, 190', 190" can be activated at a time in this way to supply power to the load circuit 197. Perforations 212, 212', 212" permit the activated cells to be separated from the remaining substrate 196 upon depletion of their power.

Since the common load circuit 197 and the bus lines 192 and 194 complete electronically conductive pathways between the two electrodes 202, 202', 202" and 204, 204', 204" of each cell 190, 190', 190", the activation of each cell 190, 190', 190" is controlled by the completion of the ionically conductive pathways between the cells. The ionically conductive pathways are closed by folding together the separated portions of the cells 190, 190', 190" as needed to supply power to the load circuit 197.

The electrochemical cell embodiments of our invention have so far been arranged primarily for purposes of producing electrical power. However, electrochemical cells can also be used for other purposes including display purposes as exemplified by the electrochemical display cell 220 depicted in FIGS. 18–20.

Figure 18:
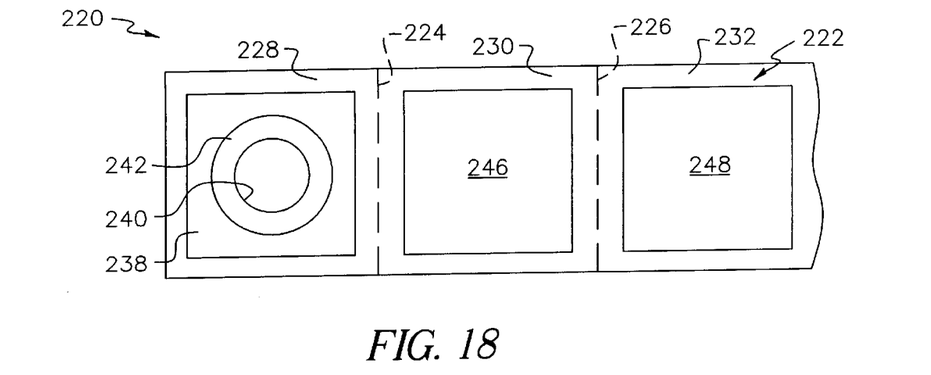
FIG. 18 is a plan view of an electrochemical display cell laid out in patterns along a continuous web substrate.

A single substrate 222 is divided by fold/tear lines 224 and 226 into three substrate portions 228, 230, and 232. The substrate portion 228 supports a printed display layer 234 and two electrode layers 236 and 238 that are separated in the vicinity of an opening 240 through the electrode 238 by a dielectric layer 242. However, a conductive adhesive layer 244 connects the surrounding portions of the two electrodes 236 and 238 to permanently complete an electronically conductive pathway between the electrodes 236 and 238. The substrate portion 230 supports an electrolyte layer 246, which is preferably formed as a pressure-sensitive electrolytic adhesive. The substrate portion 232 supports a release layer 248. A graphics layer 250 with a viewing window 252 covers an opposite surface of the common substrate 222.

Figure 19:
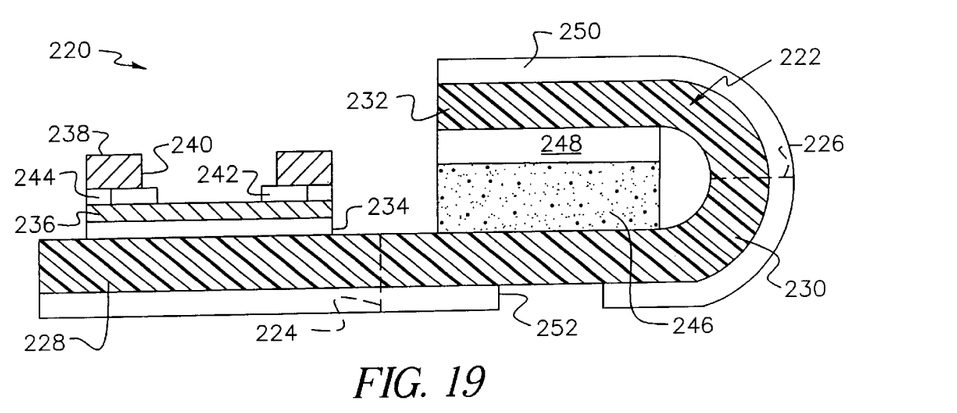
FIG. 19 is a side cross-sectional view of the display cell shown in FIG. 18 arranged in a partially assembled form for safe storage.
Figure 20:
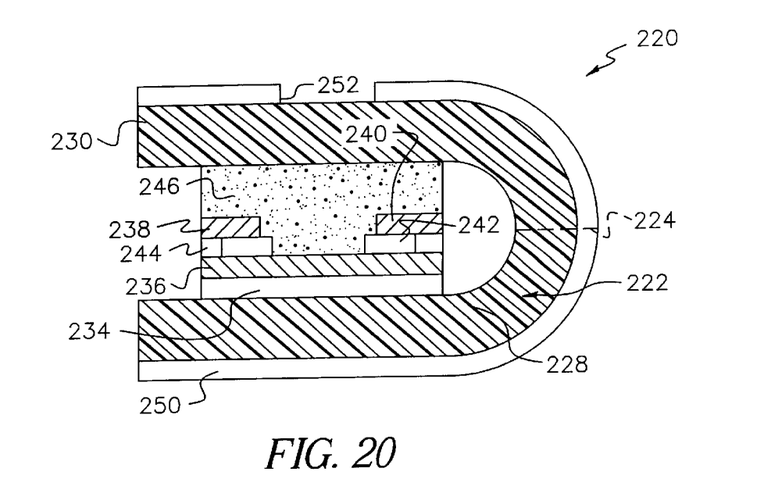
FIG. 20 is a similar cross-sectional view of the display cell shown in FIGS. 18 and 19 in a completely assembled form that also activates the display.

For purposes of deferring actuation and extending shelf life of the electrochemical display cell 220, the substrate portion 232 is folded about the fold line 226 to move the release layer 248 into a position covering the electrolyte layer 246 as shown in FIG. 19. Subsequent activation, as shown in FIG. 20, involves separating of the release layer 248 from the electrolyte layer 246 and folding the substrate portion 230 about the fold line 224 to move the electrolyte layer 246 into contact with both of the overlapping electrodes 236 and 238. The contact completes an ionically conductive pathway between the electrodes 236 and 238 and triggers a spontaneous electrochemical reaction that changes display states of the display cell 220.

For example, the electrode 236 can be made of a thin metal film such as sputtered aluminum that erodes in response to the electrochemical reaction to reveal the underlying printed display layer 234 through the window 252 in the outside graphics layer 250. Additional details of similar display cells appropriate for use in the present invention are disclosed in our copending U.S. applications Ser. No. 09/067,374 entitled "Electrochemical Display Cell with Focused Field" and Ser. No. 09/067,114 entitled "Electrochemical Display and Timing Mechanism with Migrating Electrolyte", both of which are hereby incorporated by reference. An application for one of the displays is also disclosed in U.S. Provisional Application No. 60/056,954 entitled "Service Life Indicator for water Filter", which is also hereby incorporated by reference. Any of the above embodiments of this application can also be arranged for display purposes such as by providing transparent substrates for viewing the results of their electrochemical reactions including graphic layers revealed behind eroding electrodes.

The two electrodes contained in the various examples of our electrochemical cells generally function as anodes or cathodes depending on their roles in the electrochemical reactions supported by the cells. Various choices of materials can be made for the electrodes; but for purposes of printing, materials that can be carried in printing inks are preferred. Two such materials are manganese dioxide and zinc. However, carbon can be used as both an electrode and a conductor, which is preferable for some cells.

Figure 21:
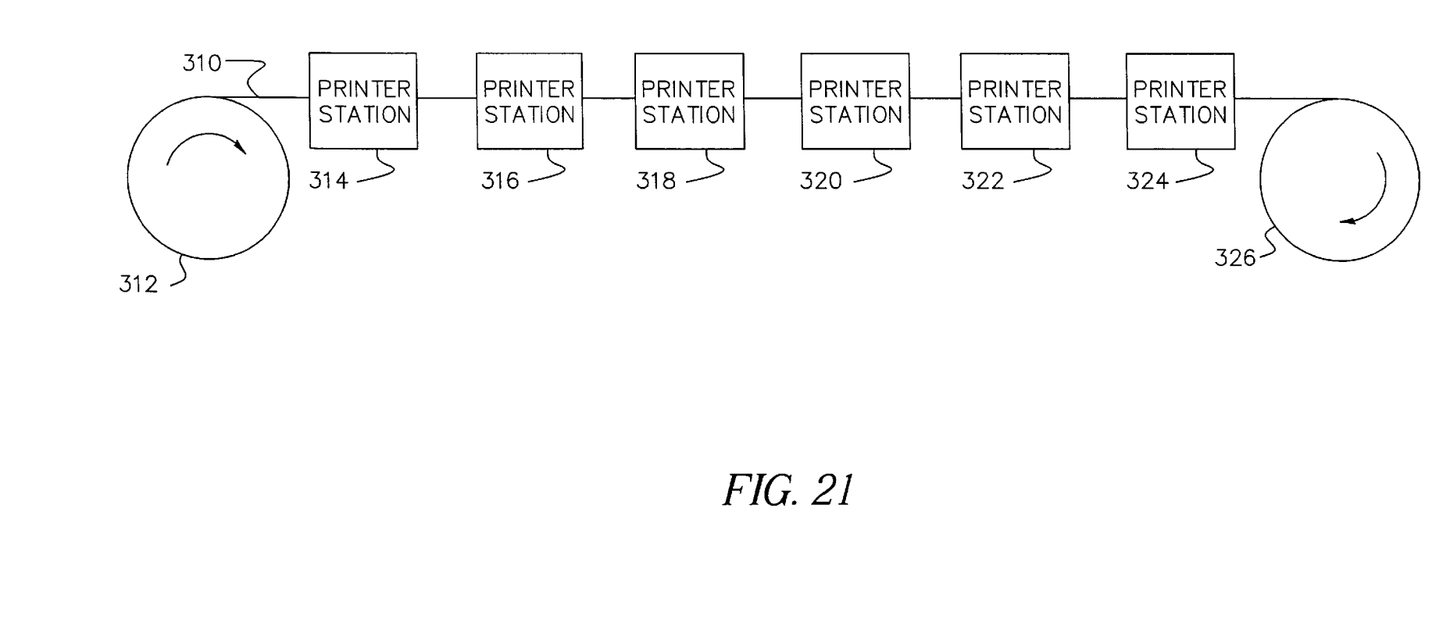
FIG. 21 is a diagram of an in-line press for making the electrochemical cells shown in the other drawing figures.

The above-described electrochemical cells can be manufactured by in-line processing, particularly by flexographic processing, for forming large numbers of the cells at low cost. A diagram of an in-line press that can be used for printing the electrochemical cells is depicted in FIG. 21.

A web 310 is unwound from a roll 312 and advanced to a printing station 314 where a succession of pairs of conductors are laid down on the web 310. The next two printing stations 316 and 318 apply a succession of pairs of electrodes in contact with the conductor pairs in a side-by-side or a stacked configuration. A series of electrolyte patterns are applied at printing station 320 to the succession of the electrodes or to adjacent portions of the web 310. Either way, the electrolyte patterns do not complete ionically conductive pathways between the pairs of electrodes. A printing station 322 applies a release layer in a continuous or discontinuous pattern to yet another portion of the web 310 including an opposite side surface of the web. A finishing operation is performed at the last station 324, which finishes a succession of printed electrochemical cells in one or more formats that maintains the electrolyte patterns out of contact with at least one of the electrodes of each pair. For example, the finishing operation can involve winding the web into a roll 326 in which the electrolyte patterns on one side of the web are in contact with the release layer on an opposite side of the web. In addition, the webs could be die cut to separate groups of one or more electrochemical cells or fan folded into one or more stacks.

The various components of the electrochemical cells are preferably applied by flexographic printing for high volume, low cost manufacture; but other printing technologies can also be used such as letterpress printing, gravure printing, and silk-screen printing. Some of the components could also be applied in advance, such as the release layer that could be applied in a continuous form to this or another web. If a metal film is used for one of the electrodes (and possibly one of the conductors), the metal film could be deposited onto this web or another substrate that is laminated to the web. The components can also be applied to more than one web, requiring an additional laminating operation, or to different web portions, requiring other manipulating operations such as die cutting and folding to arrange the components in a form intended for storage.

We claim:

1. An electrochemical cell arranged for deferred assembly comprising:

first and second electrode layers, an electrolyte layer, and a release layer;

said electrolyte layer being positioned out of contact with at least one of said electrode layers interrupting an ionically conductive pathway between said first and second electrode layers and in contact with said release layer;

said electrolyte layer being made of an electrolytic adhesive material capable of bonding with at least one said first and second electrode layers;

said release layer being made of a release material that exhibits a bonding relationship with said electrolyte layer that is weaker than the bonding relationship exhibited between said electrolyte layer and said at least one electrode layer; and said electrolyte layer being removable from the weaker bonding relationship with said release layer and movable into the stronger bonding relationship with said at least one electrode layer for completing said ionically conductive pathway between said first and second electrode layers.

2. The cell of claim 1 in which said electrolyte layer has front and back surfaces and said release layer covers said front surface of the electrolyte layer, and further comprising a first substrate portion supporting said back surface of the electrolyte layer.

3. The cell of claim 2 in which said electrolyte layer is mounted together with one of said electrodes on said first substrate portion.

4. The cell of claim 2 further comprising a second substrate portion on which at least one of said electrode layers are mounted.

5. The cell of claim 4 in which said first and second substrate portions are different portions of a single substrate separated by a fold line.

6. The cell of claim 1 in which said first and second electrode layers are laid out side-by-side on a first substrate portion, and said electrolyte layer is carried by a second substrate portion.

7. The cell of claim 1 in which said electrolyte layer is a first of two electrolyte layers, said first electrolyte layer being positioned in contact with said first electrode layer, said second electrolyte layer being positioned in contact with said second electrode layer, and said first and second electrolyte layers being positioned out of contact with each other.

8. The cell of claim 1 in which said first and second electrode layers have different electrode potentials for generating a spontaneous electrochemical reaction.

9. The cell of claim 8 in which said first electrode layer is a thin film that is eroded by the spontaneous electrochemical reaction to reveal an underlying image.

10. The cell of claim 8 further comprising an electronically conductive pathway between said first and second electrode layers, and said electronically conductive pathway being closed so that the spontaneous electrochemical reaction is started by completion of said ionically conductive pathway.

11. An electrochemical cell arranged for deferred assembly comprising:

first and second electrode layers, an electrolyte layer, and a protective layer;

said electrolyte layer being positioned out of contact with at least one of said electrode layers interrupting an ionically conductive pathway between said first and second electrode layers;

said electrolyte layer having front and back surfaces;

said protective layer covering said front surface of the electrolyte layer;

a substrate supporting the back surface of the electrolyte layer;

said protective layer being removable from said front surface of the electrolyte layer without removing said substrate from supporting said back surface of the electrolyte layer; and said front surface being movable into contact with said one electrode layer for completing the ionically conductive pathway between said first and second electrode layers.

12. The cell of claim 11 in which said substrate includes first and second substrate portions, and the electrolyte layer is mounted together with one of said electrodes on said first substrate portion.

13. The cell of claim 11 in which said substrate includes first and second substrate portions, said first and second electrode layers are laid out side-by-side on a first substrate portion, and said electrolyte layer is mounted on a second substrate portion.

14. An electrochemical cell arranged for deferred assembly comprising:

first and second electrode layers, first and second electrolyte layers, and a protective layer;

said first electrolyte layer being positioned in contact with said first electrode layer;

said second electrolyte layer being positioned in contact with said second electrode layer;

said first and second electrolyte layers being positioned out of contact with each other for interrupting an ionically conductive pathway between said first and second electrode layers;

said protective layer covering at least one of said first and second electrolyte layers;

said protective layer being removable from said one electrolyte layer; and said first and second electrolyte layers being movable into contact with each other for completing the ionically conductive pathway between said first and second electrode layers.

15. The cell of claim 14 in which said protective layer covers both of said first and second electrolyte layers.

* * * * *